US012780446B2

(12) United States Patent
Kunitake

(10) Patent No.: US 12,780,446 B2
(45) Date of Patent: Nov. 3, 2026

(54) PASSENGER BOARDING BRIDGE

(71) Applicant: SHINMAYWA INDUSTRIES, LTD., Takarazuka (JP)

(72) Inventor: Takashi Kunitake, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 427 days.

(21) Appl. No.: 18/262,698

(22) PCT Filed: Mar. 29, 2021

(86) PCT No.: PCT/JP2021/013257
§ 371 (c)(1),
(2) Date: Jul. 24, 2023

(87) PCT Pub. No.: WO2022/208601
PCT Pub. Date: Oct. 6, 2022

(65) Prior Publication Data

US 2024/0391607 A1 Nov. 28, 2024

(51) Int. Cl.
*B64F 1/305* (2006.01)

(52) U.S. Cl.
CPC .................................. *B64F 1/3055* (2013.01)

(58) Field of Classification Search
CPC ................................ B64F 1/3055; B64F 1/31
See application file for complete search history.

(56) References Cited

U.S. PATENT DOCUMENTS 12,275,539 B2 * 4/2025 Nakamura .............. B64F 1/305
2005/0198750 A1 * 9/2005 Spencer ................ B64F 1/3055 14/71.5
2015/0360369 A1 12/2015 Ishikawa et al.
2017/0120449 A1 5/2017 Matsunami et al.
2017/0326731 A1 11/2017 Ishikawa et al.
2020/0165009 A1 5/2020 Sonoda
2022/0135249 A1 5/2022 Nakamura et al.
(Continued)

FOREIGN PATENT DOCUMENTS

CN 112265648 A 1/2021
JP 2004330871 A 11/2004
JP 2020175727 A 10/2020
(Continued)

*Primary Examiner* — Gary S Hartmann
(74) *Attorney, Agent, or Firm* — Alleman Hall LLP

(57) ABSTRACT

A passenger boarding bridge includes first and second cameras and a controller. The controller is configured to express a position of various components by using a three-dimensional orthogonal coordinate system. The cameras capture images of the entrance when the cab is at a standby position. The controller calculates position coordinates of the entrance based on the images, and calculates target position coordinates of a distal end part of the cab at a temporary stop position based on the calculated position coordinates of the entrance. The controller performs an inverse kinematics calculation to calculate target position coordinates of a travel device, a target length of a lifting/lowering device, and a target rotational angle of the cab with respect to a tunnel unit for the cab to be at the temporary stop position, then causes the cab to move from the standby position to the temporary stop position.

4 Claims, 8 Drawing Sheets

(56) References Cited

U.S. PATENT DOCUMENTS

2022/0144453 A1 5/2022 Wada

FOREIGN PATENT DOCUMENTS

| | | | | | |
|---|---|---|---|---|---|
| JP | 2020175728 | A | | 10/2020 | |
| JP | 2021151868 | A | * | 9/2021 | .............. B64F 1/305 |
| JP | 6960022 | B2 | * | 11/2021 | |
| WO | 2020194933 | A1 | | 10/2020 | |

* cited by examiner

PASSENGER BOARDING BRIDGE

TECHNICAL FIELD

The present invention relates to a passenger boarding bridge.

BACKGROUND ART

Conventionally, a passenger boarding bridge is known as equipment that forms a passenger walkway between an aircraft and a terminal building of an airport. The passenger boarding bridge includes: a rotunda connected to the terminal building and supported in a horizontally rotatable manner; an extendable and retractable tunnel unit whose proximal end is connected to the rotunda; a cab rotatably provided at the distal end of the tunnel unit and docked with an entrance of the aircraft; and drive columns provided at the distal side of the tunnel unit, the drive columns serving as support legs. The drive columns include: a lifting/lowering device configured to support the tunnel unit and move the tunnel unit upward/downward; and a travel device provided under the lifting/lowering device, the travel device including a pair of travel wheels. It has been proposed to automatically move such a passenger boarding bridge (see Patent Literatures 1 to 3, for example).

For example, Patent Literature 1 discloses that a camera to capture an image of the entrance of the aircraft is mounted to the cab. When the cab is at a predetermined standby position, horizontal positional information about the entrance is calculated based on the image of the entrance captured by the camera, and based on the calculated horizontal positional information, a destination target position to which the cab is to be moved and at which the cab is to be docked with the entrance is calculated. Then, the cab at the standby position is caused to move toward the target position.

Patent Literature 2 discloses a configuration in which a head part (i.e., the cab) that is connectable to the entrance of the aircraft is provided with two cameras, i.e., first and second cameras. When an input to start driving is performed with a control panel, traveling by wheels is started by a travel drive unit, and when the head part has reached a position that is several meters away from the aircraft, the first camera and the second camera start capturing images of a first characteristic part and a second characteristic part of the aircraft. Then, by using the images captured by the first and second cameras, the position of a target point on the entrance of the aircraft is calculated, and a relative position and a relative angle of the head part with respect to the entrance of the aircraft are calculated. Based on these, a control correction amount is calculated, and based on the calculated control correction amount, various drive units are driven to move the head part toward the target point on the aircraft.

Patent Literature 3 discloses a configuration in which two cameras that are first and second cameras are installed at the terminal building to which the rotunda is connected. When an input to start driving is performed with a control panel, traveling by wheels is started by a travel drive unit, and when the head part has reached a position that is several meters away from the aircraft, the first camera and the second camera start capturing images of a first characteristic part and a second characteristic part of the aircraft. Then, by using the images captured by the first and second cameras, the position of a target point on the entrance of the aircraft is calculated, and a relative position and a relative angle of the head part with respect to the entrance of the aircraft are calculated. Based on these, a control correction amount is calculated, and based on the calculated control correction amount, various drive units are driven to move the head part toward the target point on the aircraft.

CITATION LIST

Patent Literature

PTL 1: Japanese Patent No. 6720414
PTL 2: Japanese Laid-Open Patent Application Publication No. 2020-175727
PTL 3: Japanese Laid-Open Patent Application Publication No. 2020-175728

SUMMARY OF INVENTION

Technical Problem

In the above-described configuration of Patent Literature 1, the position of each part of the passenger boarding bridge is calculated by using a two-dimensional coordinate system. However, it is often the case that the cab of the passenger boarding bridge is docked with the aircraft in a state where the tunnel unit is not horizontal but inclined. For this reason, there is a problem in that the position of each part calculated by using the two-dimensional coordinate system contains an error and is not accurate. Therefore, it is considered that moving the cab to a target position with high precision is difficult.

In the configuration of Patent Literature 2, while the head part is approaching the entrance of the aircraft, it is necessary to repeatedly calculate the relative position and the relative angle of the head part with respect to the entrance of the aircraft to calculate the control correction amount. Accordingly, although images of the entrance are captured by the first and second cameras installed on the head part while moving the head part, there is a problem in that the calculated relative position and relative angle contain errors due to factors such as vibration and warp caused by the movement of the passenger boarding bridge, and for this reason, accurate calculation cannot be performed. Therefore, it is considered that moving the head part (the cab) to a target position with high precision is difficult.

In the configuration of Patent Literature 3, the first and second cameras are installed at the terminal building, which is far away from the aircraft. For this reason, the relative position and relative angle of the head part with respect to the entrance of the aircraft cannot be calculated accurately. Therefore, it is considered that moving the head part (the cab) to a target position with high precision is difficult.

The present invention has been made to solve the above-described problems. An object of the present invention is to provide a passenger boarding bridge that makes it possible to move the cab to a target position with high precision.

Solution to Problem

In order to achieve the above object, a passenger boarding bridge according to one aspect of the present invention is a passenger boarding bridge including: a rotunda connected to a terminal building and rotatable in regular and reverse directions about a vertical axis; a tunnel unit whose proximal end is connected to the rotunda in such a manner that the tunnel unit is liftable and lowerable, the tunnel unit being configured to be extendable and retractable in a longitudinal direction of the tunnel unit; a cab rotatably provided at a distal end of the tunnel unit; a lifting/lowering device mounted to the tunnel unit or the cab and configured to lift and lower the tunnel unit or the cab by extending and retracting in a longitudinal direction of the lifting/lowering device; a travel device mounted under the lifting/lowering device, the travel device being configured to travel on a ground and rotate in regular and reverse directions about an axis that passes through a center point of the travel device, such that a travel direction of the travel device is changeable; a cab rotator configured to rotate the cab; first and second cameras mounted to the cab and each configured to capture an image of an entrance of an aircraft; and a controller configured to control the travel device, the lifting/lowering device, and the cab rotator. The controller is configured to express a position of each part of the aircraft and of the passenger boarding bridge as position coordinates by using a three-dimensional orthogonal coordinate system in which a predetermined position is set as an origin. The controller is configured to perform: a first entrance position calculation process of causing the first and second cameras to capture images of the entrance, respectively, when the cab is at a predetermined standby position from which the cab is to start moving, and calculating position coordinates of a reference point on the entrance of the aircraft based on the images of the entrance captured by the first and second cameras, respectively; a cab stop position calculation process of, based on the position coordinates of the reference point on the entrance calculated in the first entrance position calculation process, calculating target position coordinates of a reference point on a distal end part of the cab at a temporary stop position of the cab, the temporary stop position being such a position that when the cab is at the temporary stop position, the distal end part of the cab is located forward away from the entrance by a predetermined distance; a first inverse kinematics calculation process of, based on the target position coordinates of the reference point of the cab at the temporary stop position, the target position coordinates being calculated in the cab stop position calculation process, and a first desired rotational angle of the cab at the temporary stop position with respect to a particular horizontal direction, performing an inverse kinematics calculation to calculate target position coordinates of the center point of the travel device, a target length of the lifting/lowering device, and a target rotational angle of the cab with respect to the tunnel unit for the cab to be at the temporary stop position; and a first moving process of moving the cab from the standby position to the temporary stop position by performing: a process of causing the travel device to travel such that coordinates of the center point of the travel device are brought into coincidence with the target position coordinates calculated in the first inverse kinematics calculation process; a process of causing the lifting/lowering device to extend or retract to adjust a length of the lifting/lowering device to the target length calculated in the first inverse kinematics calculation process; and a process of driving the cab rotator to adjust a rotational angle of the cab with respect to the tunnel unit to the target rotational angle calculated in the first inverse kinematics calculation process.

According to the above configuration, the position of each part of the aircraft and of the passenger boarding bridge is expressed by position coordinates in the three-dimensional orthogonal coordinate system. When the cab is at the standby position, the position coordinates of the reference point on the entrance of the aircraft are calculated based on the images of the entrance captured by the respective first and second cameras, and based on the calculated position coordinates, the target position coordinates of the reference point on the distal end part of the cab at the temporary stop position are calculated. Then, based on the target position coordinates of the reference point of the cab and the orientation (the first desired rotational angle) of the cab at the temporary stop position, the inverse kinematics calculation is performed to calculate the target position coordinates of the center point of the travel device, the target length of the lifting/lowering device, and the target rotational angle of the cab with respect to the tunnel unit for the cab to be at the temporary stop position, and based on these calculation results, the travel device, the lifting/lowering device, and the cab rotator are driven to move the cab from the standby position to the temporary stop position.

As described above, when the cab is at the standby position, images of the entrance of the aircraft are captured by the respective first and second cameras mounted to the cab, and the position of the reference point on the entrance is calculated as absolute coordinates (position coordinates in the three-dimensional orthogonal coordinate system). Based on the calculated absolute coordinates, the target position coordinates of the reference point of the cab at the temporary stop position are calculated. Accordingly, while the cab is moving from the standby position to the temporary stop position, since it is not necessary to calculate the position of the reference point on the entrance of the aircraft, it is also not necessary to perform image capturing by the first and second cameras, and moving the cab to the target position (the temporary stop position) can be performed with high precision.

The first inverse kinematics calculation process may include: a first calculation process of, on an assumption that the cab is in a horizontal state, approximately calculating coordinates, in two respective horizontal directions, of a center point of the cab at the temporary stop position and the target rotational angle, of the cab with respect to the tunnel unit, corresponding to the first desired rotational angle by using the target position coordinates of the reference point of the cab at the temporary stop position and the first desired rotational angle of the cab at the temporary stop position with respect to the particular horizontal direction, then, on the assumption that the cab is in the horizontal state, calculating coordinates, in the two respective horizontal directions, of a foot of a perpendicular drawn onto a center line of the tunnel unit from the reference point of the cab at the temporary stop position, and by determining a coordinate of the foot of the perpendicular in a height direction to be the same as a coordinate of the reference point of the cab at the temporary stop position in the height direction, calculating position coordinates of the foot of the perpendicular; and a second calculation process of calculating the target position coordinates of the center point of the travel device and the target length of the lifting/lowering device for the cab to be at the temporary stop position by performing an inverse kinematics calculation by using the position coordinates, calculated in the first calculation process, of the foot of the perpendicular.

The first desired rotational angle may be, in a plan view, an angle that is formed by the particular horizontal direction and a horizontal direction orthogonal to a fuselage guide line drawn on an apron.

The passenger boarding bridge may further include a pair of distance sensors that are mounted to the cab such that the distance sensors are away from each other in a horizontal direction, the pair of distance sensors being configured to measure distances, respectively, each between the distal end part of the cab and the aircraft. The controller may be configured to further perform: a cab rotation process of, while the cab is stopped at the temporary stop position, driving the cab rotator to rotate the cab such that the distances, each between the distal end part of the cab and the aircraft, measured by the pair of distance sensors, respectively, are equalized; a second entrance position calculation process of, after the cab rotation process, causing one of the first and second cameras to capture an image of the entrance, and calculating the position coordinates of the reference point on the entrance based on the captured image of the entrance and the distances, each between the distal end part of the cab and the aircraft, measured by the pair of distance sensors, respectively; a cab docking position calculation process of calculating target position coordinates of the reference point of the cab at a docking position of the cab, the docking position being a position at which the distal end part of the cab is to be docked with the entrance, based on the position coordinates, calculated in the second entrance position calculation process, of the reference point on the entrance; a second inverse kinematics calculation process of calculating target position coordinates of the center point of the travel device, a target length of the lifting/lowering device, and a target rotational angle of the cab with respect to the tunnel unit for the cab to be at the docking position by performing an inverse kinematics calculation based on the target position coordinates, calculated in the cab docking position calculation process, of the reference point of the cab at the docking position and a second desired rotational angle of the cab at the docking position with respect to the particular horizontal direction; and a second moving process of moving the cab from the temporary stop position to the docking position by performing: a process of causing the travel device to travel such that the center point of the travel device moves toward the target position coordinates calculated in the second inverse kinematics calculation process; a process of extending or retracting the lifting/lowering device to adjust the length of the lifting/lowering device to the target length calculated in the second inverse kinematics calculation process; and a process of driving the cab rotator to adjust the rotational angle of the cab with respect to the tunnel unit to the target rotational angle calculated in the second inverse kinematics calculation process.

According to the above configuration, when the cab is at the temporary stop position, the cab is rotated such that distances each between the distal end part of the cab and the aircraft are equalized. Then, based on an image of the entrance captured by one of the first and second cameras and the distances each between the distal end part of the cab and the aircraft, the distances being measured by the respective distance sensors, the position coordinates of the reference point on the entrance of the aircraft are calculated, and based on the calculated position coordinates, the target position coordinates of the reference point on the distal end part of the cab at the docking position are calculated. Then, based on the target position coordinates of the reference point of the cab and the orientation (the second desired rotational angle) of the cab at the docking position, the inverse kinematics calculation is performed to calculate the target position coordinates of the center point of the travel device, the target length of the lifting/lowering device, and the target rotational angle of the cab with respect to the tunnel unit for the cab to be at the docking position, and based on these calculation results, the travel device, the lifting/lowering device, and the cab rotator are driven to move the cab from the temporary stop position to the docking position.

As described above, when the cab is at the temporary stop position, the position of the reference point on the entrance of the aircraft is calculated as absolute coordinates, and based on the absolute coordinates, the target position coordinates of the reference point of the cab at the docking position are calculated. Accordingly, while the cab is moving from the temporary stop position to the docking position, since it is not necessary to calculate the position of the reference point on the entrance of the aircraft, it is also not necessary to perform image capturing by the cameras, and moving the cab to the target position (the docking position) can be performed with high precision. Also, at the temporary stop position, distances each between the distal end part of the cab and the aircraft are measured by the respective distance sensors. Accordingly, the position coordinates of the reference point on the entrance can be calculated with high precision, and also, the docking position of the cab can be calculated with high precision. Consequently, automatic docking of the cab with the aircraft can be performed properly.

The second inverse kinematics calculation process may include: a third calculation process of, on an assumption that the cab is in a horizontal state, approximately calculating coordinates, in two respective horizontal directions, of a center point of the cab at the docking position and the target rotational angle, of the cab with respect to the tunnel unit, corresponding to the second desired rotational angle by using the target position coordinates of the reference point of the cab at the docking position and the second desired rotational angle of the cab at the docking position with respect to the particular horizontal direction, then, on the assumption that the cab is in the horizontal state, calculating coordinates, in the two respective horizontal directions, of a foot of a perpendicular drawn onto a center line of the tunnel unit from the reference point of the cab at the docking position, and by determining a coordinate of the foot of the perpendicular in a height direction to be the same as a coordinate of the reference point of the cab at the docking position in the height direction, calculating position coordinates of the foot of the perpendicular; and a fourth calculation process of calculating the target position coordinates of the center point of the travel device and the target length of the lifting/lowering device for the cab to be at the docking position by performing an inverse kinematics calculation by using the position coordinates, calculated in the third calculation process, of the foot of the perpendicular.

The second desired rotational angle may be, in a plan view, an angle that is formed by the particular horizontal direction and a horizontal direction orthogonal to a tangent line that touches a part, of the aircraft, with which the cab is to be docked, the tangent line extending horizontally.

Advantageous Effects of Invention

The present invention is configured as described above, and has an advantage of being able to provide a passenger boarding bridge that makes it possible to move the cab to a target position with high precision.

The above and other objects, features, and advantages of the present invention will more fully be apparent from the following detailed description of preferred embodiments with accompanying drawings.

DESCRIPTION OF EMBODIMENTS

Figure 1:
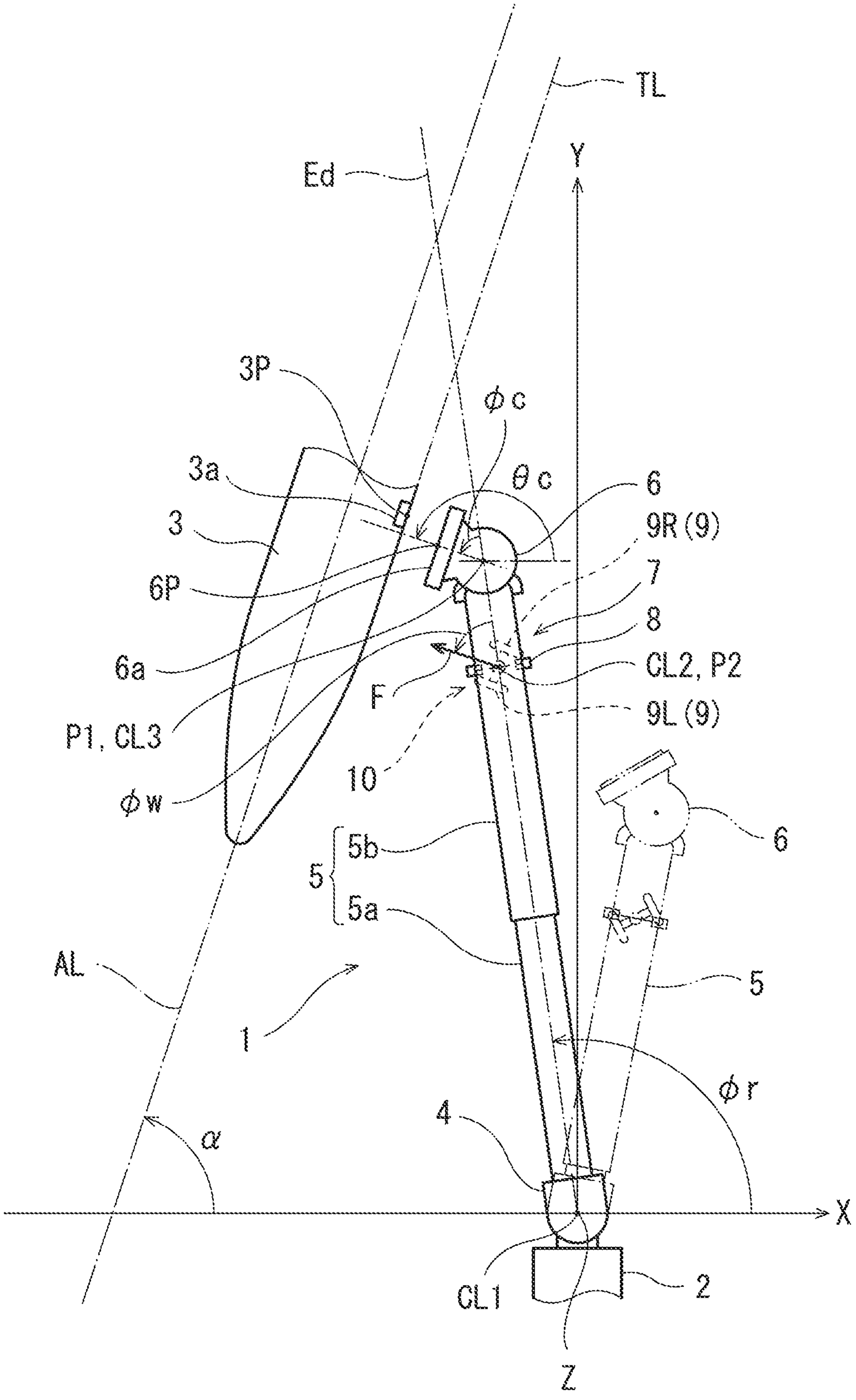
FIG. 1 is a schematic plan view showing one example of a passenger boarding bridge according to an embodiment of the present invention.

Hereinafter, preferred embodiments of the present invention are described with reference to the drawings. In the drawings, the same or corresponding elements are denoted by the same reference signs, and repeating the same descriptions is avoided below. The drawings show each component schematically in order to facilitate the understanding thereof. Therefore, in some cases, the drawings may not display accurate shapes, accurate dimensional ratios, etc. The present invention is not limited to the embodiments described below.

Embodiments

Figure 2:
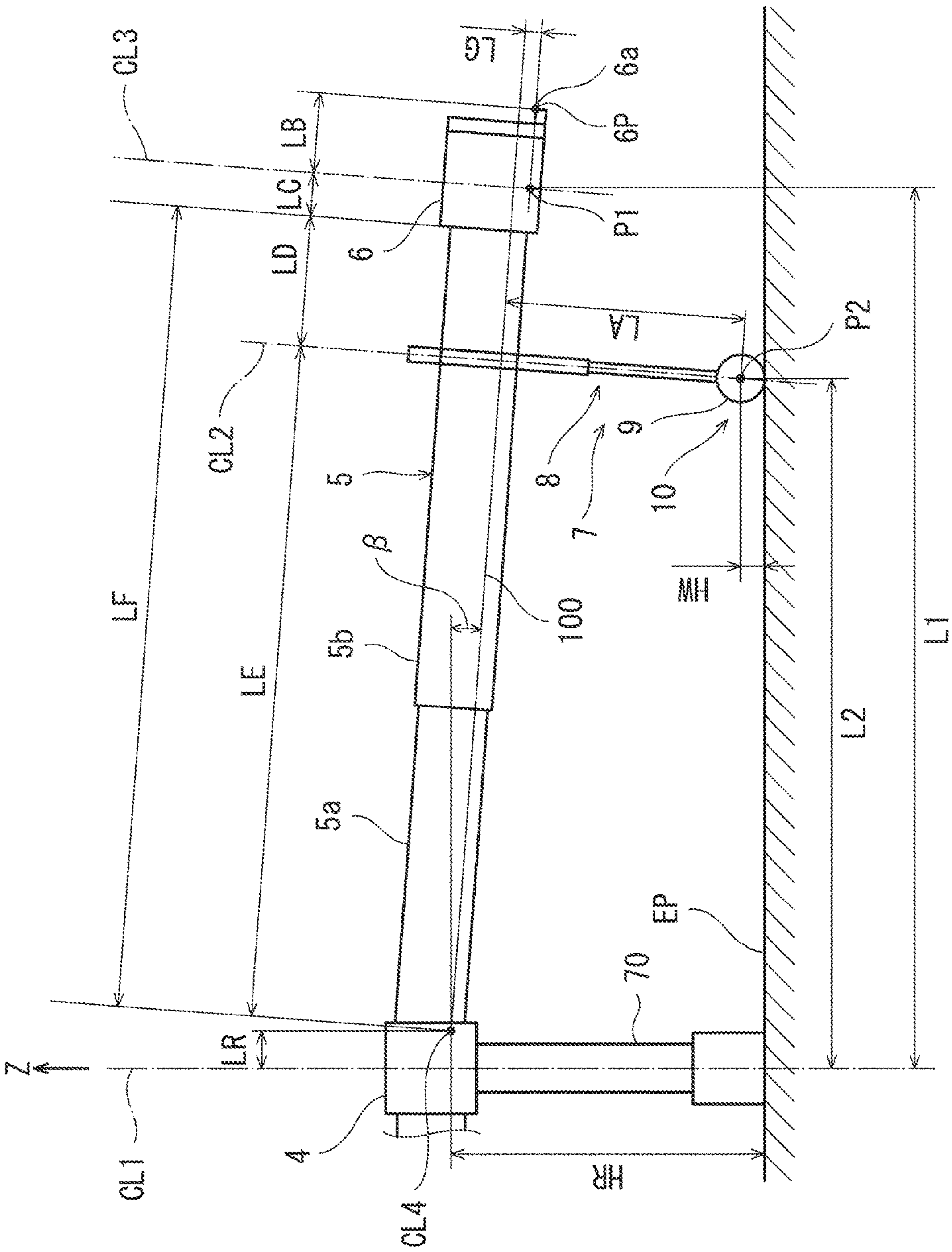
FIG. 2 is a schematic side view of the passenger boarding bridge.
Figure 3:
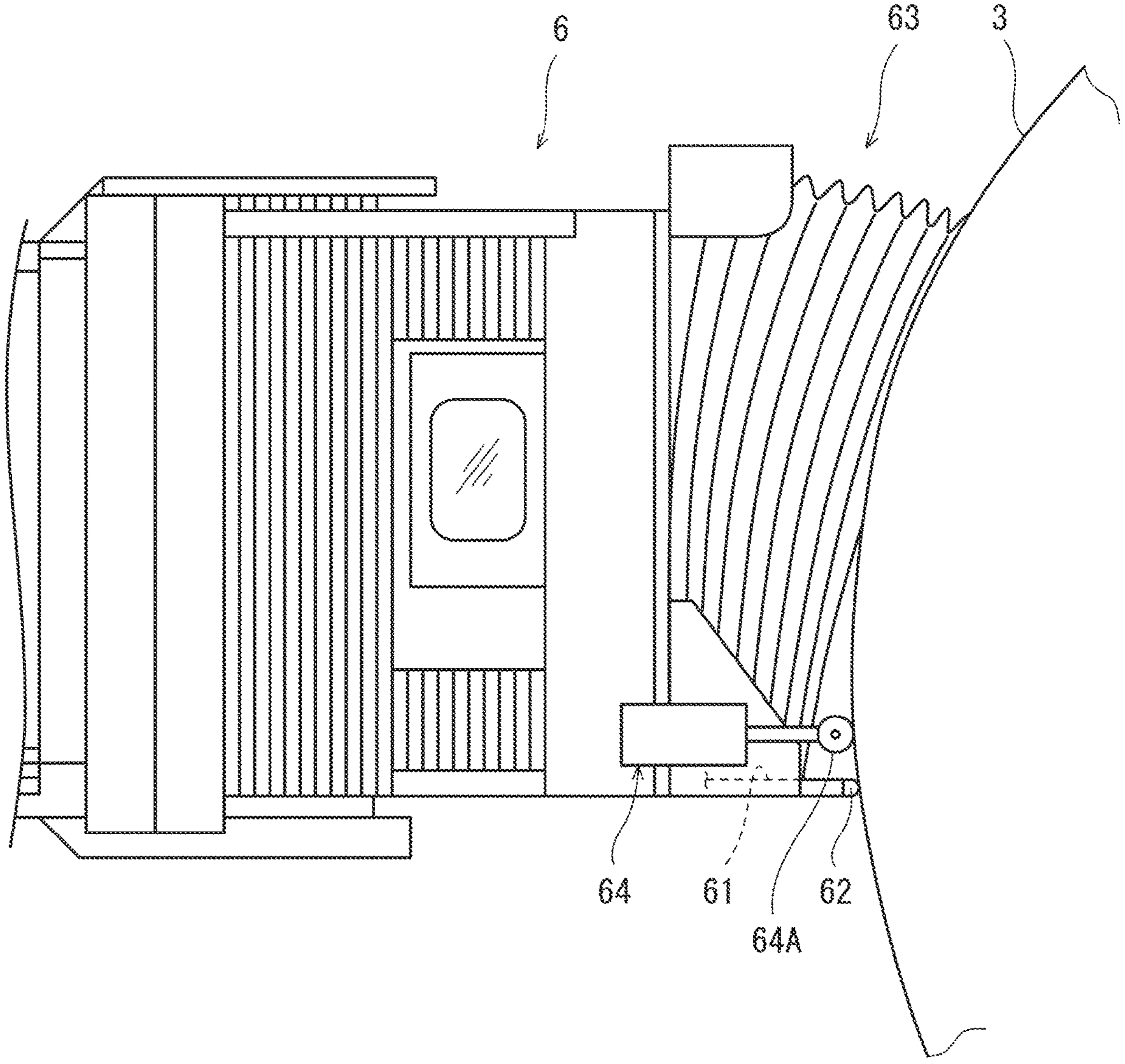
FIG. 3 is a side view showing one example of a state where a cab is docked with an aircraft.
Figure 4:
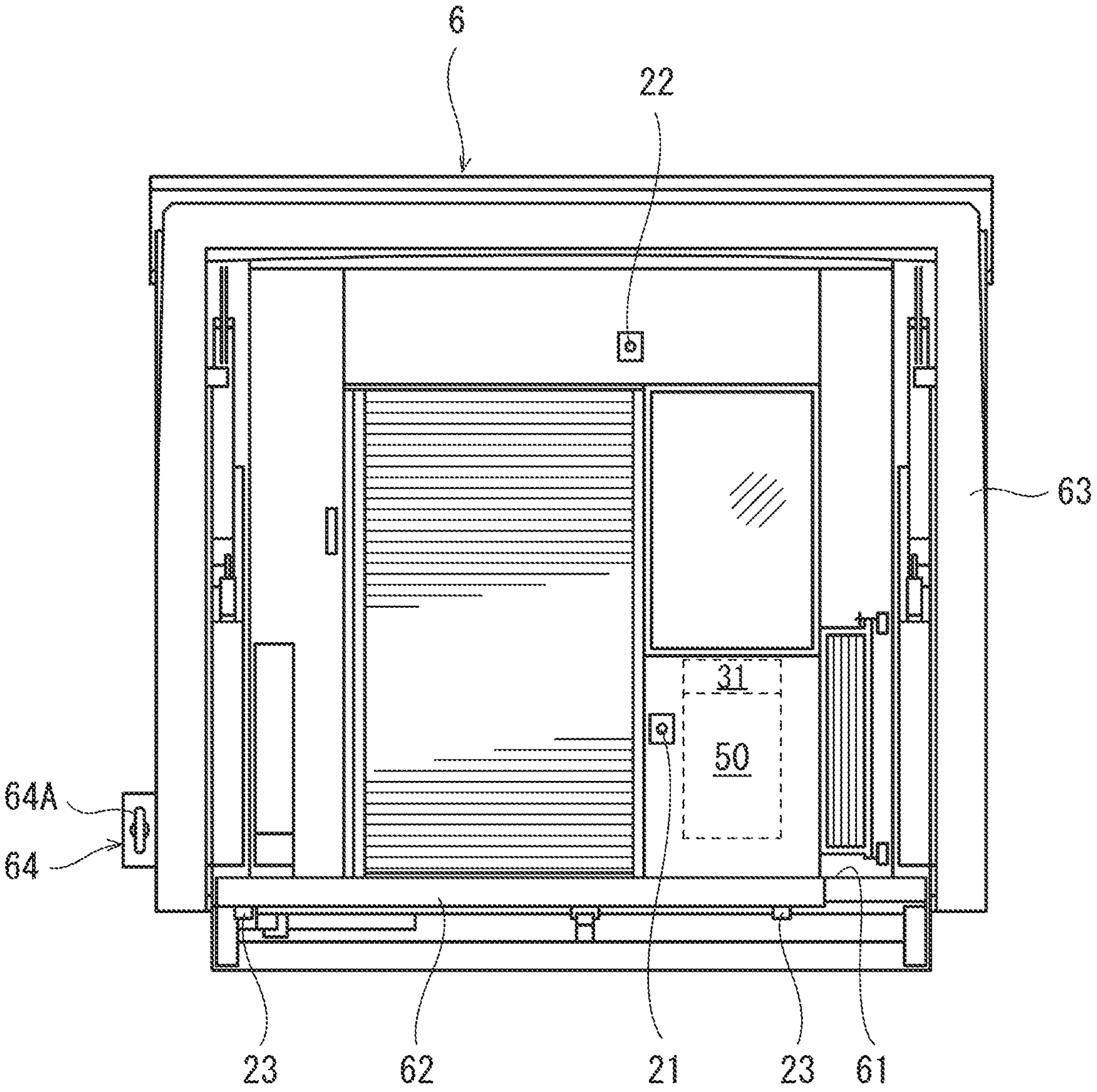
FIG. 4 is a front view of a cab distal end part to be docked with the aircraft (the front view is taken from the aircraft side).
Figure 5:
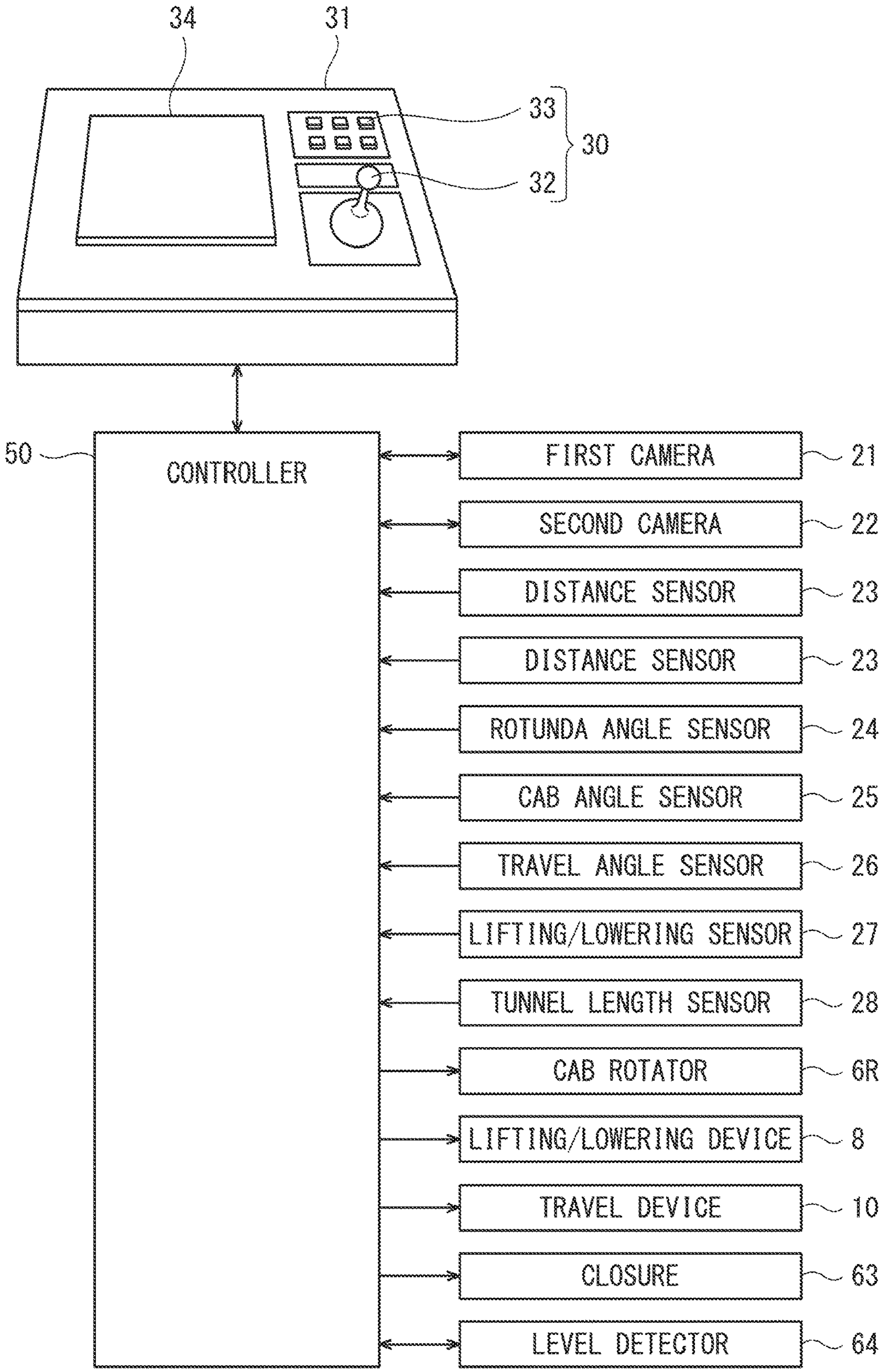
FIG. 5 shows one example of a control panel, etc.

FIG. 1 is a schematic plan view showing one example of a passenger boarding bridge according to an embodiment of the present invention. FIG. 2 is a schematic side view of the passenger boarding bridge. FIG. 3 is a side view showing one example of a state where a cab is docked with an aircraft. FIG. 4 is a front view of a cab distal end part to be docked with the aircraft (the front view is taken from the aircraft side). FIG. 5 shows one example of a control panel, etc.

The passenger boarding bridge 1 includes: a horizontally rotatable rotunda (proximal-end round room) 4 connected to an entrance of a terminal building 2 of an airport; a tunnel unit 5, whose proximal end is connected to the rotunda 4 in such a manner that the tunnel unit 5 is liftable and lowerable, the tunnel unit 5 being configured to be extendable and retractable in the longitudinal direction of the tunnel unit 5; a cab (distal-end round room) 6 provided at the distal end of the tunnel unit 5 in such a manner that the cab 6 is rotatable in regular and reverse directions; and drive columns 7.

The rotunda 4 is supported by a support pillar 70, such that the rotunda 4 is rotatable in regular and reverse directions about a rotational axis (vertical axis) CL1.

The tunnel unit 5 forms a passenger walkway, and includes a plurality of tubular tunnels 5*a* and 5*b*, which are fitted together in a nested manner, such that the tunnel unit 5 is extendable and retractable in the longitudinal direction thereof. In the description herein, the tunnel unit 5 is formed by the two tunnels 5*a* and 5*b* as one example. The tunnel unit 5 is formed by at least two tunnels. The proximal end part of the tunnel unit 5 is connected to the rotunda 4 in such a manner that the proximal end part is swingable (vertically) about a horizontal rotational axis CL4 (see FIG. 2). That is, the proximal end part of the tunnel unit 5 is connected to the rotunda 4 in such a manner that the tunnel unit 5 is liftable and lowerable.

The drive columns 7, which serve as support legs, are mounted to the distal side of the tunnel unit 5 (specifically, the tunnel 5*b*, which is the frontmost tunnel). It should be noted that the drive columns 7 may be mounted to the cab 6.

The drive columns 7 are provided with a lifting/lowering device 8, which moves the cab 6 and the tunnel unit 5 upward and downward (i.e., lifts and lowers the cab 6 and the tunnel unit 5). The lifting/lowering device 8 includes, for example, a pair of extendable and retractable support pillar portions, each of which is formed by two pillars fitted in a nested manner. The tunnel unit 5 is supported by the pair of support pillar portions of the lifting/lowering device 8. By extending or retracting the pair of support pillar portions, the lifting/lowering device 8 can lift or lower the tunnel unit 5 (i.e., move the tunnel unit 5 upward or downward). Accordingly, the cab 6 and the tunnel unit 5 can be swung vertically with respect to the rotunda 4.

The drive columns 7 are further provided with a travel device 10 including two travel wheels 9 (a right travel wheel 9R and a left travel wheel 9L), which are drivable to rotate independently of each other in regular and reverse directions. The travel device 10 is provided under the lifting/lowering device 8. The travel device 10 is configured to travel forward (travel in an arrow F direction) by regular rotation of the two travel wheels 9, and to travel backward (travel in a direction opposite to the arrow F direction) by reveres rotation of the two travel wheels 9. The travel device 10 is also configured to be rotatable in regular and reverse directions about a rotational axis CL2, such that the rudder angle is changeable within the range of −90 degrees to +90 degrees with respect to the extension/retraction direction (longitudinal direction) of the tunnel unit 5, and thus the travel direction of the travel device 10 is changeable. For example, by causing the two travel wheels 9 to rotate in opposite directions to each other, the travel direction (the facing direction of the travel wheels 9) can be changed on the spot. By causing the travel device 10 (the travel wheels 9) to travel on the apron, the tunnel unit 5 can be rotated about the rotunda 4 and can be extended/retracted.

The cab 6 is provided at the distal end of the tunnel unit 5. The cab 6 is configured to be rotatable, by a cab rotator 6R (see FIG. 5), in regular and reverse directions about a rotational axis CL3, which is perpendicular to the floor surface of the cab 6.

As shown in FIG. 3 and FIG. 4, a bumper 62 is provided at the distal end of a floor 61 of the cab 6 to be docked with an aircraft 3. A plurality of (in this example, two) distance sensors 23 (e.g., laser distance meters), each of which serves as means for measuring the distance between the cab 6 and the aircraft 3, are mounted to the bumper 62, such that the distance sensors 23 are arranged in the left-right direction of the bumper 62. It should be noted that the installation positions of the distance sensors 23 are changeable as necessary. For example, the distance sensors 23 may be arranged on the floor 61 of the cab 6.

Further, as shown in FIG. 4, first and second cameras 21 and 22 each for capturing an image of an entrance (door 3*a*) of the aircraft 3 are installed at respective positions that are recessed from the distal end part of the cab 6. Each of the first and second cameras 21 and 22 is preferably a camera whose image-capturing direction is adjustable (changeable) in relation to the cab 6 and whose angle of view is adjustable. In this example, the second camera 222 is disposed above the first camera 21. The installation positions of these first and second cameras 21 and 22 may be changed as necessary, so long as the first and second cameras 21 and 22 are disposed away from each other and can each capture an image of the door 3*a* of the aircraft 3.

A closure 63 is provided at the distal end part of the cab 6. The closure 63 includes a bellows portion that is expandable and contractible in the front-back direction. By docking the cab 6 with the aircraft 3 and expanding the bellows portion forward, the front end of the bellows portion can be brought into contact with the aircraft 3 around the entrance (door 3*a*) thereof.

A level detector 64 including a wheel 64A movable forward is disposed on, for example, a side wall of the cab 6. The level detector 64 is a device configured to detect the amount of upward/downward movement of the aircraft 3 with respect to the cab 6 when the aircraft 3 moves upward/downward due to, for example boarding/disembarking of passengers or loading/unloading of cargo after the cab 6 is docked with the aircraft 3. When the level detector 64 is operated, the wheel 64A moves forward to come into contact with the surface of the fuselage of the aircraft 3 with an optimal pressure. The wheel 64A rotates when the aircraft 3 moves upward or downward. Based on the direction and angle of the rotation of the wheel 64A, the level detector 64 detects the amount of upward/downward movement of the aircraft 3, and if the detected amount of the upward/downward movement of the aircraft 3 is greater than or equal to a predetermined amount, outputs the detected amount of the upward/downward movement to a controller 50. The controller 50 controls the lifting/lowering device 8 of the drive columns 7, such that the cab 6 follows the upward/downward movement of the aircraft 3.

As shown in FIG. 5, the passenger boarding bridge 1 further includes: a rotunda angle sensor 24, which detects a rotational angle Ør (see FIG. 1) of the rotunda 4; a cab angle sensor 25, which detects a rotational angle @c (see FIG. 1) of the cab 6 with respect to the tunnel unit 5; a travel angle sensor 26, which detects a rotational angle @w (FIG. 1) (an angle indicating a travel direction) of the travel device 10 with respect to the tunnel unit 5; a lifting/lowering sensor 27, which detects the amount of lifting/lowering by the lifting/lowering device 8; and a tunnel length sensor 28, which detects the length of the tunnel unit 5 and which is configured as, for example, a distance meter. These sensors are arranged at suitable positions, respectively.

It should be noted that FIG. 1 shows the tunnel unit 5 being in a horizontal state (i.e., a state in which an inclination angle β shown in FIG. 2 is 0) and the cab 6 being in a state in which the distal end part of the cab 6 faces the aircraft 3. On the other hand, FIG. 2 shows the tunnel unit 5 being inclined by the inclination angle β and the cab 6 being in a state in which the distal end part of the cab 6 faces in the same direction as the extending direction of the tunnel unit 5 (i.e., the rotational angle Φc of the cab 6 is 0). As shown in FIG. 2, the lifting/lowering device 8 is mounted to the tunnel unit 5 of the passenger boarding bridge 1, such that the extending/retracting direction of the tunnel unit 5 and the extending/retracting direction (lifting/lowering direction) of the lifting/lowering device 8 are orthogonal to each other.

A control panel 31 as shown in FIG. 5 is provided inside the cab 6. The control panel 31 includes various operation switches 33 for performing operations, such as lifting/lowering the tunnel unit 5 and the cab 6 by the lifting/lowering device 8 and rotating the cab 6. The control panel 31 further includes: an operating lever 32 for operating the travel device 10; and a display device 34. The operating lever 32 is configured as a lever-shaped input device (i.e., a joystick) that has degrees of freedom multi-directionally. The operating lever 32 and the various operation switches 33 collectively serve as an operating device 30. It should be noted that the configuration of the operating device 30 is modifiable as necessary.

The controller 50 and the control panel 31 are connected to each other via electrical circuitry. The controller 50 is configured to: receive inputs of information that is based on operations performed with the operating device 30, such as operation commands; receive inputs of, for example, output signals from the sensors 23 to 28; control the operations of the passenger boarding bridge 1; and output, for example, information to be displayed on the display device 34.

It should be noted that the controller 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. As a result of the control program being executed by the arithmetic processing unit, the controller 50 performs, for example, controlling the operations of the components of the passenger boarding bridge 1 (the operations of, for example, the travel device 10, the lifting/lowering device 8, and the cab rotator 6R). It should be noted that information to be stored while the passenger boarding bridge 1 is in operation is also stored in the storage unit. The controller 50 may be configured as a single control device performing centralized control, or may be configured as a plurality of control devices performing distributed control in cooperation with each other via the Internet and LAN. For example, the cab 6 or the frontmost tunnel 5*b* is provided with the controller 50.

The controller 50 uses an XYZ orthogonal coordinate system as shown in FIG. 1 to recognize in real time the position (coordinates) of each part of the passenger boarding bridge 1. Specifically, as absolute coordinates, the intersection point of the rotational axis CL1 of the rotunda 4 and the plane of an apron EP (see FIG. 2) is set as an origin (0, 0, 0), and an X-axis, a Y-axis, and a Z-axis (an axis extending vertically) are set with respect to the origin. Each part of the passenger boarding bridge 1 is expressed by position coordinates in the coordinate system. Of the position coordinates, an X coordinate value, a Y coordinate value, and a Z coordinate value each indicate a distance (e.g., in units of [mm]) from the origin (0, 0, 0), which is the position of the rotational axis CL1 of the rotunda 4. In this example, in FIG. 1, X coordinate values on the right side of the origin (0, 0, 0) are positive X coordinate values, and X coordinate values on the left side of the origin (0, 0, 0) are negative X coordinate values. Y coordinate values on the opposite side of the origin (0, 0, 0) from the terminal building 2 are positive Y coordinate values. Z coordinate values upward of the origin (0, 0, 0) are positive Z coordinate values.

The controller 50 expresses the position of each part of the aircraft 3 and of the passenger boarding bridge 1 as position coordinates by using the above-described three-dimensional orthogonal coordinate system (XYZ orthogonal coordinate system). Accordingly, "position coordinates" referred to hereinafter are three-dimensional position coordinates.

In FIG. 1, "Ed" indicates a center line of the tunnel unit 5 (the center line extending in the longitudinal direction of the tunnel unit 5), and the rotational angle Ør of the rotunda 4, which is detected by the rotunda angle sensor 24, is, in a plan view, an angle that is formed by the center line Ed of the tunnel unit 5, the angle being calculated counterclockwise with respect to the X-axis, the angle being a rotational angle of the rotunda 4 with respect to a particular horizontal direction (the positive direction of the X-axis). The rotational angle Φc of the cab 6, which is detected by the cab angle sensor 25, is a rotational angle of the cab 6 with respect to the center line Ed of the tunnel unit 5. The rotational angle Φw of the travel device 10, which is detected by the travel angle sensor 26, is, in a plan view, a rotational angle of the travel device 10 with respect to the center line Ed of the tunnel unit 5.

FIG. 1 shows a rotational angle Φc of the cab 6, which is a rotational angle of the cab 6 with respect to the particular horizontal direction (the positive direction of the X-axis). Hereinafter, in some cases, the rotational angle Φc of the cab 6 is referred to as a cab absolute angle θc, and the rotational angle Φc of the cab 6 is referred to as a cab relative angle Φc. In a case where the tunnel unit 5 is in a horizontal state (where the inclination angle β in FIG. 2 is 0), θc=Φc+Φr.

In FIG. 2, a straight line 100 is a straight line that is drawn in the extending/retracting direction of the tunnel unit 5 from a connection point (CL4) where the rotunda 4 and the tunnel unit 5 are connected, and a distance from a center point P2 of the travel device 10 (i.e., the center point of the two travel wheels 9) to the straight line 100 can be detected by the lifting/lowering sensor 27 as a length LA of the extendable and retractable lifting/lowering device 8.

The controller 50 prestores, in the storage unit, the following values: a distance LB (predetermined value) from a center point P1 of the cab 6 to a reference point 6P on a distal end part 6*a* of the cab 6; a distance LC (predetermined value) from the center point P1 of the cab 6 to the distal end of the tunnel unit 5; a distance LD (predetermined value) from the distal end of the tunnel unit 5 to a mounting position of the drive columns 7; a distance LR (predetermined value) from a center point of the rotunda 4 to the connection point (located on the horizontal rotational axis CL4) where the rotunda 4 and the tunnel unit 5 are connected; a height HR (predetermined value) of the connection point; a radius HW (predetermined value) of the travel wheels 9; and a height difference LG between the reference point 6P and the straight line 100. A distance LE from the proximal end of the tunnel unit 5 (the aforementioned connection point) to the mounting position of the drive columns 7 can be calculated by subtracting the distance LD from a length LF, detected by the tunnel length sensor 28, of the tunnel unit 5.

Here, when the distance LE, which can be calculated by using the detection value LF of the tunnel length sensor 28, and the length LA of the lifting/lowering device 8, which is detected by the lifting/lowering sensor 27, are determined, a horizontal distance L2 from the center point of the rotunda 4 to the center point P2 of the travel device 10, and a height of the center point P2 of the travel device 10 (the height is expressed by a constant Z coordinate value indicating the radius HW), are uniquely determined. Similarly, a horizontal distance L1 from the center point of the rotunda 4 to the center point P1 of the cab 6, and a height of the center point P1 of the cab 6 (the height is expressed by a Z coordinate value), are also uniquely determined. Further, when the rotational angle Ør of the rotunda 4 is determined, the XY coordinate values of the center point P2 of the travel device 10, and the XY coordinate values of the center point P1 of the cab 6, are uniquely determined. Consequently, the position coordinates of the center point P2 of the travel device 10, and the position coordinates of the center point P1 of the cab 6, are uniquely determined. Further, when the cab relative angle Φc detected by the cab angle sensor 25 is determined, the position coordinates of the reference point 6P on the distal end part 6*a* of the cab 6 are also uniquely determined.

Accordingly, the controller 50 sequentially obtains the detection value LF of the tunnel length sensor 28, the detection value LA of the lifting/lowering sensor 27, and the detection value Φr of the rotunda angle sensor 24. From these values, the position coordinates of the center point P2 of the travel device 10 and the position coordinates of the center point P1 of the cab 6 can be calculated based on forward kinematics. The controller 50 also sequentially obtains the cab relative angle Φc in addition to the aforementioned detection values LF, LA, and Φr. Accordingly, the position coordinates of the reference point 6P on the distal end part 6*a* of the cab 6 can also be calculated based on forward kinematics. It should be noted that the reference point 6P of the cab 6 is set such that, when the cab 6 is seen from above in the direction of the rotational axis CL3, an angle formed by the center line Ed of the tunnel unit 5 and a line segment connecting between the reference point 6P and the center point P1 of the cab 6 is the cab relative angle Φc. A straight line passing through the reference point 6P and the center point P1 of the cab 6, and a straight line extending along the distal end part 6*a* of the cab 6, are orthogonal to each other.

Next, one example of operations of the passenger boarding bridge 1 is described. Before the aircraft 3 arrives at the apron, the passenger boarding bridge 1 stands by at a predetermined standby position indicated by two-dot chain line of FIG. 1. A regular stop position for the aircraft 3 is a predetermined position at which the aircraft axis of the aircraft 3 is on a fuselage guide line AL, and the regular stop position is set in the extending direction of the fuselage guide line AL. Although the aircraft 3 is stopped targeting the regular stop position, it is not always that case that an actual stop position of the aircraft 3 is exactly the regular stop position. It should be noted that the fuselage guide line AL is drawn on the apron ground. An angle α that is formed by the fuselage guide line AL and the X-axis is prestored in the storage unit of the controller 50 as a predetermined value.

The standby position of the passenger boarding bridge 1 is a movement start position from which the passenger boarding bridge 1 is to start moving at the time of performing docking with the entrance (door 3*a*) of the aircraft 3. At the time of docking the passenger boarding bridge 1 with the entrance of the aircraft 3, the cab 6 moves from the standby position to a temporary stop position, and then moves to a docking position at which the cab 6 is docked with the entrance. Thereafter, when the cab 6 is undocked from the entrance, the passenger boarding bridge 1 returns to and stops at the standby position, and then the passenger boarding bridge 1 stands by at the standby position until an operation of docking the cab 6 with the entrance of the next aircraft starts. It should be noted that when the cab 6 is undocked from the aircraft 3 and returned to the standby position, target position coordinates of the center point P2 of the travel device 10 for the cab 6 to be at the standby position are prestored in the controller 50.

Figure 6:
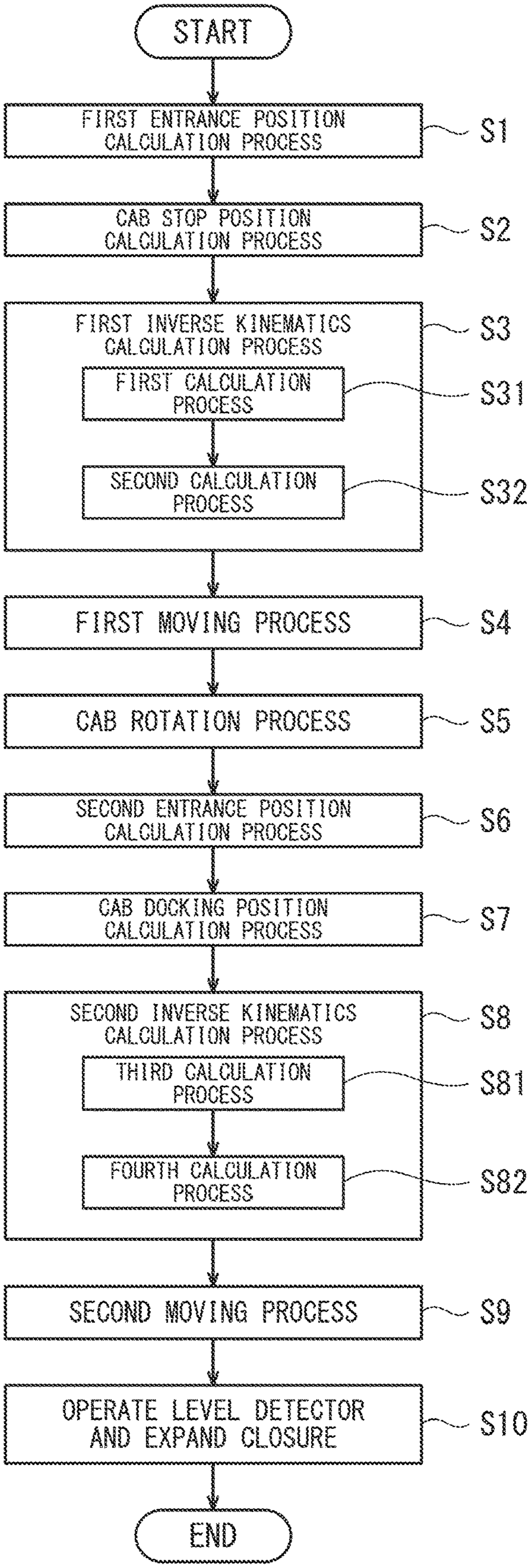
FIG. 6 is a flowchart showing one example of operations of the passenger boarding bridge at the time of docking.

Operations of the passenger boarding bridge 1 until it is docked with the aircraft 3 are automatically performed based on control performed by the controller 50. This automatic control is performed as described below. FIG. 6 is a flowchart showing one example of operations performed when docking the cab 6 of the passenger boarding bridge 1 with the aircraft 3. Operations of the passenger boarding bridge 1 are realized by control performed by the controller 50. It should be noted that "position coordinates" referred to hereinafter are also three-dimensional position coordinates in the three-dimensional orthogonal coordinate system (XYZ orthogonal coordinate system).

When the passenger boarding bridge 1 (the cab 6) is at the standby position, an operator presses an automatic control start button (one of the operation switches 33) on the control panel 31, and thereby automatic control described below is started.

Figure 7:
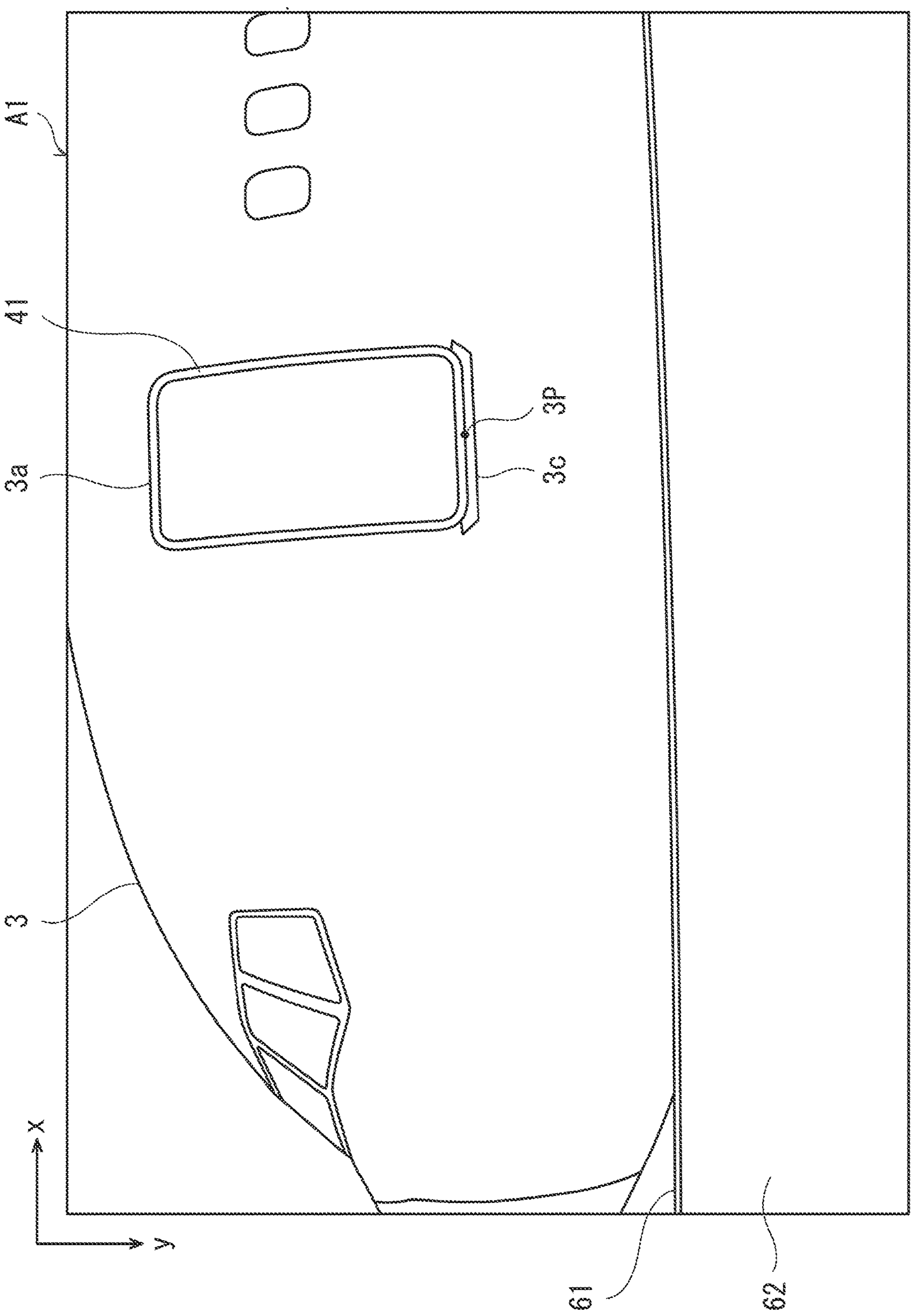
FIG. 7 is a schematic diagram showing one example of an image captured by a camera when the cab is at a standby position.

When the above start button is pressed, the controller 50 performs a first entrance position calculation process in step S1. In step S1, first, the controller 50 causes the first and second cameras 21 and 22 to capture images of the entrance (door 3*a*) of the aircraft 3, respectively. At the time, if the entrance of the aircraft 3 is not within the field(s) of view of the first and/or second cameras, the cab rotator 6R may be driven to adjust, for example, the image-capturing directions of the cameras 21 and 22 to bring the entrance of the aircraft 3 into the fields of view of the respective first and second cameras 21 and 22. FIG. 7 is a schematic diagram showing one example of an image captured by the first camera 21 when the cab is at the standby position. A contour portion of the door 3*a* of the aircraft 3 is painted so that the door 3*a* can be visually recognized (a painted portion 41). In FIG. 7, x- and y-axes of a captured image A1 represent a camera coordinate system.

Subsequently, the controller 50 obtains captured image data of the images captured by the two cameras 21 and 22, and based on the captured image data, calculates position coordinates (position coordinates in the XYZ orthogonal coordinate system) of a reference point 3P on the door 3*a* of the aircraft 3. At the time, the door 3*a* and the reference point 3P on the door 3*a* can be detected based on, for example, the contour painted portion 41 of the door 3*a* and the shape of a reinforcing plate 3*c*. As shown in FIG. 7, the reference point 3P on the door 3*a* is positioned on a middle portion of the door sill (or may be positioned on an upper-end middle portion of the reinforcing plate 3*c* provided immediately under the door 3*a*).

The controller 50 detects the reference point 3P on the door 3*a* by performing image processing on the captured image data of the images captured by the two cameras 21 and 22, and calculates directions of the reference point 3P on the door 3*a* as seen from the respective two cameras 21 and 22. The position coordinates of the reference point 3P on the door 3*a* can be calculated by using, for example, the calculated two directions from the respective cameras 21 and 22, mounting positions at which the respective two cameras 21 and 22 are mounted to the cab 6, mounting angles with which the respective two cameras 21 and 22 are mounted to the cab 6, and the position coordinates of the center point P1 of the cab 6 when the cab 6 is at the standby position.

Next, the controller 50 performs a cab stop position calculation process in step S2. In step S2, the controller 50 calculates the position coordinates of a target position (target position coordinates) of the predetermined reference point 6P on the distal end part 6*a* (the bumper 62) of the cab 6 at the temporary stop position, which is the first destination for the cab 6.

Figure 8A:
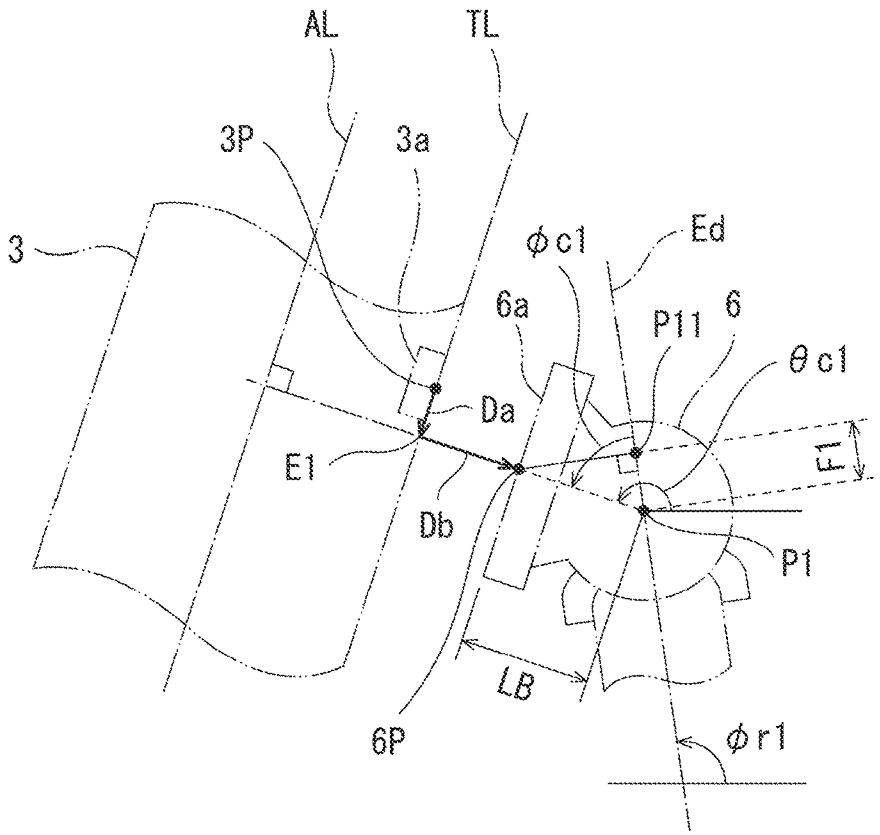
FIG. 8A is a diagram for describing one example of a target position of a reference point of the cab at a temporary stop position in relation to a reference point on an entrance of the aircraft.

FIG. 8A shows one example of the target position of the reference point 6P of the cab 6 at the temporary stop position. The height of the target position of the reference point 6P of the cab 6 at the temporary stop position is, for example, set to be the same as the height of the reference point 3P on the door 3*a*. Also, in a case where a position that is away from the reference point 3P on the door 3*a* in a direction parallel to the fuselage guide line AL by a predetermined distance Da to the left side of the door 3*a* is a position E1, the horizontal position of the target position of the reference point 6P is set to a position that is shifted from the position E1 in a direction perpendicular to the fuselage guide line AL and away from the aircraft 3 by a predetermined distance Db (e.g., 1000 mm). With these settings, the target position coordinates of the reference point 6P of the cab 6 at the temporary stop position are calculated.

Next, the controller 50 performs a first inverse kinematics calculation process in step S3. In step S3, based on the target position coordinates, calculated in step S2, of the reference point 6P of the cab 6 at the temporary stop position and a first desired rotational angle (θc1) of the cab 6 at the temporary stop position with respect to a particular horizontal direction (X-axis positive direction), the controller 50 performs an inverse kinematics calculation (a calculation based on inverse kinematics) to calculate target position coordinates of the center point P2 of the travel device 10, a target length LA1 of the lifting/lowering device 8 (a target value of the length LA of the lifting/lowering device 8), and a target value Φc1 of the cab relative angle Φc for the cab 6 to be at the temporary stop position. Here, the first desired rotational angle (θc1) of the cab 6 at the temporary stop position with respect to the particular horizontal direction (X-axis positive direction) is a desired value of the cab absolute angle θc at the temporary stop position. The desired value (c1) is, in a plan view, the cab absolute angle θc when the cab distal end part 6*a* is parallel to the fuselage guide line AL. That is, the desired value (θc1) of the cab absolute angle θc is, in a plan view, an angle formed by the X-axis positive direction and a horizontal direction orthogonal to the fuselage guide line AL. Here, since the angle that the fuselage guide line AL forms with the X-axis is a (predetermined value), the desired value (θc1) of the cab absolute angle θc can be calculated as (α+90) degrees.

In step S3, preferably, step S31 is performed before step S32. In a first calculation process in step S31, first, on the assumption that the cab 6 is in a horizontal state (i.e., the rotational axis CL3 of the cab 6 is in a perpendicular state), the XY coordinates (coordinates in two respective horizontal directions) of the center point P1 of the cab 6 at the temporary stop position, and the target value Φc1 of the cab relative angle (a target rotational angle of the cab) corresponding to the first desired rotational angle θc1, are calculated approximately by using the target position coordinates of the reference point 6P of the cab 6 at the temporary stop position and the first desired rotational angle θc1 of the cab 6 at the temporary stop position.

Here, for example, the XY coordinates of the reference point 6P on the distal end of the cab 6, the first desired rotational angle θc1, and the distance LB (predetermined value) between the center point P1 and the reference point 6P of the cab 6 are used to calculate the XY coordinates of the center point P1 of the cab 6. Then, a rotational angle Φr1 of the rotunda 4 is calculated from the XY coordinates of the center point P1 of the cab 6, and the target value Φc1 of the cab relative angle is calculated as Φc1=θc1−Φr1.

Further, the coordinates (XY coordinates), in the two respective horizontal directions, of a foot P11 of a perpendicular drawn onto the center line Ed of the tunnel unit 5 from the reference point 6P of the cab 6 at the temporary stop position are calculated on the assumption that the cab 6 is in a horizontal state, and the position coordinates (XYZ coordinates) of the foot P11 of the perpendicular are calculated by determining the coordinate (Z coordinate) of the foot P11 of the perpendicular in the height direction to be the same as the coordinate (Z coordinate) of the reference point 6P of the cab 6 at the temporary stop position in the height direction. It should be noted that even in a case where the cab 6 is not in a horizontal state, the height of the foot P11 of the perpendicular is the same as the height of the reference point 6P of the cab 6.

The XY coordinates of the foot P11 of the perpendicular may be calculated, for example, in the following manner. First, a distance F1 between the center point P1 of the cab 6 and the foot P11 of the perpendicular is calculated. The distance F1 can be calculated by using the distance LB between the center point P1 and the reference point 6P of the cab 6 and the target value Φc1 of the cab relative angle. Next, by using the distance F1 and the rotational angle Φr1 of the rotunda 4, a difference in the X-axis direction from the center point P1 of the cab 6 and a difference in the Y-axis direction from the center point P1 of the cab 6 are calculated, and by adding the difference in the X-axis direction and the difference in the Y-axis direction to the X coordinate and the Y coordinate of the center point P1 of the cab 6, respectively, the X coordinate and the Y coordinate of the foot P11 of the perpendicular can be calculated.

In a second calculation process in the next step S32, by performing an inverse kinematics calculation by using the position coordinates of the foot P11 of the perpendicular, which are calculated in the above-described first calculation process, the target position coordinates of the center point P2 of the travel device 10 and the target length LA1 of the lifting/lowering device 8 for the cab 6 to be at the temporary stop position are calculated. It should be noted that the foot P11 of the perpendicular and the center point P1 of the cab 6 are present in the same plane orthogonal to the rotational axis CL3 of the cab 6, such that the foot P11 of the perpendicular and the center point P1 of the cab 6 are apart from each other by the distance F1 in the extending/retracting direction of the tunnel unit 5.

In the above description, the inverse kinematics calculation process in step S3 is performed in the form of the calculation processes in step S31 and step S32. However, this is merely a non-limiting example. The inverse kinematics calculation process in step S3 may be performed, for example, by a different method such as convergent calculation.

Next, the controller 50 performs a first moving process in step S4. In the first moving process, the cab 6 is moved from the standby position to the temporary stop position. Specifically, the controller 50 causes the travel device 10 to travel such that the coordinates of the center point P2 of the travel device 10 are brought into coincidence with the target position coordinates calculated in step S3, causes the lifting/lowering device 8 to extend or retract to adjust the length LA of the lifting/lowering device 8 to the target length LA1 calculated in step S3, and drives the cab rotator 6R to adjust the cab relative angle c to the target rotational angle (c1) calculated in step S3, thereby moving the cab 6 from the standby position to the temporary stop position.

Next, the controller 50 performs a cab rotation process in step S5 when the cab 6 is at the temporary stop position. In the cab rotation process, while the cab 6 is stopped at the temporary stop position, the controller 50 drives the cab rotator 6R, such that the distance between the distal end part **6*a* of the cab 6 and the aircraft 3 measured by one of the pair of distance sensors 23 and the distance between the distal end part 6*a* of the cab 6 and the aircraft 3 measured by the other one of the pair of distance sensors 23 are equalized. That is, in a plan view, the distal end part 6*a* of the cab 6 is made parallel to a tangent line TL, which touches a part, of the aircraft 3, with which the cab 6 is to be docked (the part is specifically the door 3*a* and the vicinity thereof; hereinafter, this part is referred to as "the cab 6-docked part" of the aircraft 3), the tangent line TL extending horizontally along the surface of the cab 6**-docked part.

Next, the controller 50 performs a second entrance position calculation process in step S6. In step S6, first, the controller 50 causes one of the first and second cameras 21 and 22 (e.g., the camera 21) to capture an image of the entrance (door **3*a*) of the aircraft 3. Subsequently, the controller 50 obtains captured image data of the image captured by the camera 21, and calculates the position coordinates of the reference point 3P on the door 3*a* of the aircraft 3 (position coordinates in the XYZ orthogonal coordinate system) based on, for example, the following: the captured image data; distances each between the distal end part 6*a* of the cab 6 and the aircraft 3, the distances being measured by the respective distance sensors 23; the mounting position at which the one camera (e.g., the camera 21) is mounted to the cab 6 and the mounting angle with which the one camera (e.g., the camera 21) is mounted to the cab 6; and the position coordinates of the center point P1 of the cab 6 at the temporary stop position. Here, the position coordinates of the reference point 3P on the door 3*a* are calculated with higher precision in step S6 than in step S1, because in step S6, the image data of the image captured in a shorter distance is used and accurate distance measurement is performed with the distance sensors 23**.

Next, the controller 50 performs a cab docking position calculation process in step S7. In step S7, based on the position coordinates, calculated in step S6, of the reference point 3P on the door **3*a*, the controller 50 calculates target position coordinates of the reference point 6P of the cab 6 at a docking position of the cab 6, the docking position being a position at which the distal end part 6*a* of the cab 6 is to be docked with the door 3*a***.

Figure 8B:
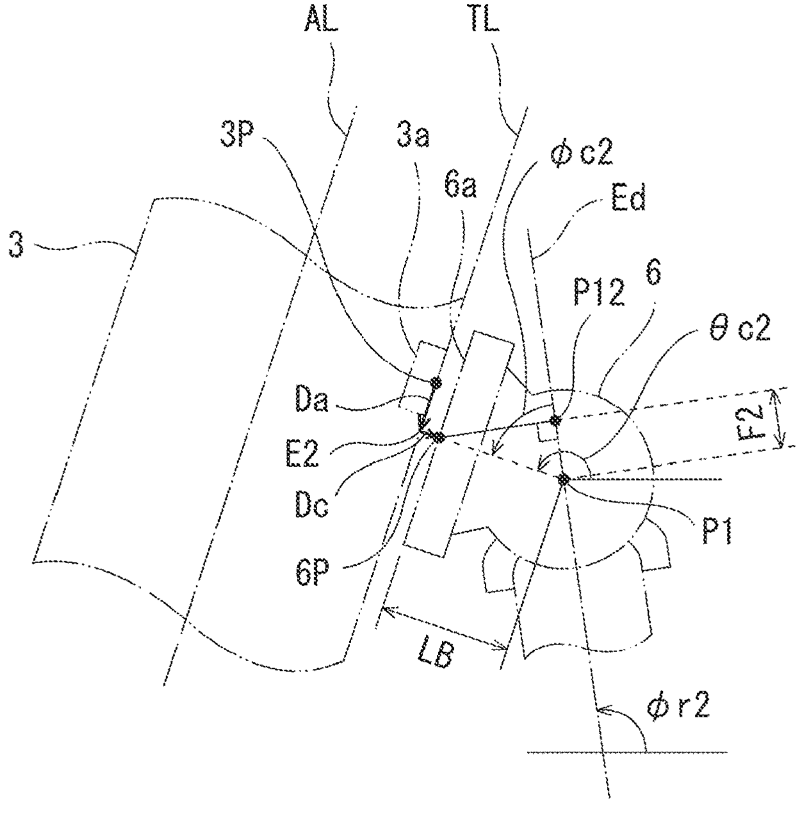
FIG. 8B is a diagram for describing one example of a target position of the reference point of the cab at a docking position in relation to the reference point on the entrance of the aircraft.

FIG. 8B shows one example of the target position of the reference point 6P of the cab 6 at the docking position. The height of the target position of the reference point 6P of the cab 6 at the docking position is, for example, set to be lower than the height of the reference point 3P on the door **3*a* by a predetermined distance (e.g., 150 mm). Also, in a plan view, in a case where a position that is away from the reference point 3P on the door 3*a* in a direction along the tangent line TL by the predetermined distance Da to the left side of the door 3*a* is a position E2, the horizontal position of the target position of the reference point 6P is set to a position that is shifted from the position E2 in a direction perpendicular to the tangent line TL and away from the aircraft 3 by a predetermined distance Dc (e.g., 20 mm). With these settings, the target position coordinates of the reference point 6P of the cab 6 at the docking position are calculated. The tangent line TL is a tangent line that touches the cab 6-docked part (the door 3*a* and the vicinity thereof) of the aircraft 3 and that extends horizontally along the surface of the cab 6**-docked part.

Next, the controller 50 performs a second inverse kinematics calculation process in step S8. In step S8, based on the target position coordinates, calculated in step S7, of the reference point 6P of the cab 6 at the docking position and a second desired rotational angle (θc2) of the cab 6 at the docking position with respect to the particular horizontal direction (X-axis positive direction), the controller 50 performs an inverse kinematics calculation (a calculation based on inverse kinematics) to calculate target position coordinates of the center point P2 of the travel device 10, a target length LA2 of the lifting/lowering device 8 (a target value of the length LA of the lifting/lowering device 8), and a target value Φc2 of the cab relative angle Φc for the cab 6 to be at the docking position. Here, the second desired rotational angle (θc2) of the cab 6 at the docking position with respect to the particular horizontal direction (X-axis positive direction) is a desired value of the cab absolute angle θc at the docking position. The desired value (θc2) is, in a plan view, the cab absolute angle θc when the cab distal end part 6*a* is parallel to the tangent line TL. That is, the desired value (θc2) of the cab absolute angle θc is, in a plan view, an angle formed by the X-axis positive direction and a horizontal direction orthogonal to the tangent line TL. Currently, the distal end part 6*a* of the cab 6 is parallel to the tangent line TL as a result of the rotation process of the cab 6 in step S5. Accordingly, the desired value (θc2) of the cab absolute angle θc can be calculated by adding up the rotational angle Ør of the rotunda 4 currently detected by the rotunda angle sensor 24 and the cab relative angle Φc currently detected by the cab angle sensor 25. It should be noted that, in the rotation process of the cab 6 in step S5, there may be a case where a stop error occurs and the distal end part 6*a* of the cab 6 deviates from the state of being parallel to the tangent line TL. In this case, an angle corresponding to the deviation may be further added in the calculation of the desired value (θc2).

In step S8, preferably, step S81 is performed before step S82. In a third calculation process in step S81, first, on the assumption that the cab 6 is in a horizontal state (i.e., the rotational axis CL3 of the cab 6 is in a perpendicular state), the XY coordinates (coordinates in the two respective horizontal directions) of the center point P1 of the cab 6 at the docking position, and the target value Φc2 of the cab relative angle (a target rotational angle of the cab) corresponding to the second desired rotational angle θc2, are calculated approximately by using the target position coordinates of the reference point 6P of the cab 6 at the docking position and the second desired rotational angle θc2 of the cab 6 at the docking position.

Here, for example, the XY coordinates of the reference point 6P on the distal end of the cab 6, the second desired rotational angle θc2, and the distance LB (predetermined value) between the center point P1 and the reference point 6P of the cab 6 are used to calculate the XY coordinates of the center point P1 of the cab 6. Then, a rotational angle Ør2 of the rotunda 4 is calculated from the XY coordinates of the center point P1 of the cab 6, and the target value @c2 of the cab relative angle is calculated as Φc2=θc2−Φr2.

Further, the coordinates (XY coordinates), in the two respective horizontal directions, of a foot P12 of a perpendicular drawn onto the center line Ed of the tunnel unit 5 from the reference point 6P of the cab 6 at the docking position are calculated on the assumption that the cab 6 is in a horizontal state, and the position coordinates (XYZ coordinates) of the foot P12 of the perpendicular are calculated by determining the coordinate (Z coordinate) of the foot P12 of the perpendicular in the height direction to be the same as the coordinate (Z coordinate) of the reference point 6P of the cab 6 at the docking position in the height direction. It should be noted that even in a case where the cab 6 is not in a horizontal state, the height of the foot P12 of the perpendicular is the same as the height of the reference point 6P of the cab 6.

The XY coordinates of the foot P12 of the perpendicular may be calculated, for example, in the following manner. First, a distance F2 between the center point P1 of the cab 6 and the foot P12 of the perpendicular is calculated. The distance F2 can be calculated by using the distance LB between the center point P1 and the reference point 6P of the cab 6 and the target value Φc2 of the cab relative angle. Next, by using the distance F2 and the rotational angle Φr2 of the rotunda 4, a difference in the X-axis direction from the center point P1 of the cab 6 and a difference in the Y-axis direction from the center point P1 of the cab 6 are calculated, and by adding the difference in the X-axis direction and the difference in the Y-axis direction to the X coordinate and the Y coordinate of the center point P1 of the cab 6, respectively, the X coordinate and the Y coordinate of the foot P12 of the perpendicular can be calculated.

In a fourth calculation process in the next step S82, by performing an inverse kinematics calculation by using the position coordinates of the foot P12 of the perpendicular, which are calculated in the above-described third calculation process, the target position coordinates of the center point P2 of the travel device 10 and the target length LA2 of the lifting/lowering device 8 for the cab 6 to be at the docking position are calculated. It should be noted that the foot P12 of the perpendicular and the center point P1 of the cab 6 are present in the same plane orthogonal to the rotational axis CL3 of the cab 6, such that the foot P12 of the perpendicular and the center point P1 of the cab 6 are apart from each other by the distance F2 in the extending/retracting direction of the tunnel unit 5.

In the above description, the inverse kinematics calculation process in step S8 is performed in the form of the calculation processes in step S81 and step S82. However, this is merely a non-limiting example. The inverse kinematics calculation process in step S8 may be performed, for example, by a different method such as convergent calculation.

Next, the controller 50 performs a second moving process in step S9. In the second moving process, the cab 6 is moved from the temporary stop position to the docking position. Here, for example, the controller 50 causes the lifting/lowering device 8 to extend or retract to adjust the length LA of the lifting/lowering device 8 to the target length LA2 calculated in step S8, and drives the cab rotator 6R to adjust the cab relative angle Φc to the target rotational angle (Φc2) calculated in step S8. Thereafter, the controller 50 causes the travel device 10 to travel such that the coordinates of the center point P2 of the travel device 10 are brought into coincidence with the target position coordinates calculated in step S8. At the time, the controller 50 may cause the travel device 10 to travel such that the center point P2 of the travel device 10 moves toward the target position coordinates, and as described above, may stop the travel device 10 at a point when the center point P2 reaches the target position coordinates, or may stop the travel device 10 at a point when the distance between the distal end part 6*a* of the cab 6 and the aircraft 3, the distance being measured by the distance sensors 23 during the traveling, has become a predetermined distance. In the manner thus described, the cab 6 gets docked with the aircraft 3.

Next, in step S10, the controller 50 operates the level detector 64, and expands the closure 63. Here, either one of operating the level detector 64 or expanding the closure 63 may precede the other. It should be noted that the process in step S10 may be performed based on an operation by an operator.

In the present embodiment, the position of each part of the aircraft 3 and of the passenger boarding bridge 1 is expressed by position coordinates in the three-dimensional orthogonal coordinate system. When the cab 6 is at the standby position, the position coordinates of the reference point 3P on the entrance of the aircraft 3 are calculated based on the images of the entrance captured by the respective first and second cameras 21 and 22, and based on the calculated position coordinates, the target position coordinates of the reference point 6P on the distal end part 6*a* of the cab 6 at the temporary stop position are calculated. Then, based on the target position coordinates of the reference point 6P of the cab 6 and the orientation (the first desired rotational angle θc1) of the cab 6 at the temporary stop position, the inverse kinematics calculation is performed to calculate the target position coordinates of the center point P2 of the travel device 10, the target length LA1 of the lifting/lowering device 8, and the target value Φc1 of the cab relative angle Φc for the cab 6 to be at the temporary stop position, and based on these calculation results, the travel device 10, the lifting/lowering device 8, and the cab rotator 6R are driven to move the cab 6 from the standby position to the temporary stop position.

As described above, when the cab 6 is at the standby position, images of the entrance of the aircraft 3 are captured by the respective first and second cameras 21 and 22 mounted to the cab 6, and the position of the reference point 3P on the entrance is calculated as absolute coordinates (position coordinates in the three-dimensional orthogonal coordinate system). Based on the calculated absolute coordinates, the target position coordinates of the reference point 6P of the cab 6 at the temporary stop position are calculated. Accordingly, while the cab 6 is moving from the standby position to the temporary stop position, since it is not necessary to calculate the position of the reference point 3P on the entrance of the aircraft 3, it is also not necessary to perform image capturing by the first and second cameras 21 and 22, and moving the cab 6 to the target position (the temporary stop position) can be performed with high precision.

When the cab 6 is at the temporary stop position, the cab 6 is rotated such that distances each between the distal end part 6*a* of the cab 6 and the aircraft 3 are equalized. Then, based on an image of the entrance captured by one of the first and second cameras 21 and 22 and the distances each between the distal end part 6*a* of the cab 6 and the aircraft 3, the distances being measured by the respective distance sensors 23, the position coordinates of the reference point 3P on the entrance of the aircraft 3 are calculated, and based on the calculated position coordinates, the target position coordinates of the reference point 6P on the distal end part 6*a* of the cab 6 at the docking position are calculated. Then, based on the target position coordinates of the reference point 6P of the cab 6 and the orientation (the second desired rotational angle θc2) of the cab 6 at the docking position, the inverse kinematics calculation is performed to calculate the target position coordinates of the center point P2 of the travel device 10, the target length LA2 of the lifting/lowering device 8, and the target value Φc2 of the cab relative angle Φc for the cab 6 to be at the docking position, and based on these calculation results, the travel device 10, the lifting/lowering device 8, and the cab rotator 6R are driven to move the cab 6 from the temporary stop position to the docking position.

As described above, also when the cab 6 is at the temporary stop position, the position of the reference point 3P on the entrance of the aircraft 3 is calculated as absolute coordinates, and based on the absolute coordinates, the target position coordinates of the reference point 6P of the cab 6 at the docking position are calculated. Accordingly, while the cab 6 is moving from the temporary stop position to the docking position, since it is not necessary to calculate the position of the reference point 3P on the entrance of the aircraft 3, it is also not necessary to perform image capturing by the cameras, and moving the cab 6 to the target position (the docking position) can be performed with high precision. Also, at the temporary stop position, distances each between the distal end part 6*a* of the cab 6 and the aircraft 3 are measured by the respective distance sensors 23. Accordingly, the position coordinates of the reference point 3P on the entrance can be calculated with high precision, and also, the docking position of the cab 6 can be calculated with high precision.

Consequently, automatic docking of the cab 6 with the aircraft 3 can be performed properly.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a passenger boarding bridge that makes it possible to move the cab to a target position with high precision.

REFERENCE CHARACTER LIST

- 1 passenger boarding bridge
- 3 aircraft
- 3*a* door
- 4 rotunda
- 5 tunnel unit
- 6 cab
- 6R cab rotator
- 8 lifting/lowering device
- 10 travel device
- 21 first camera
- 22 second camera
- 23 distance sensor
- 50 controller

The invention claimed is:

1. A passenger boarding bridge comprising:

a rotunda connected to a terminal building, the rotunda being rotatable in forward and reverse directions about a vertical axis;

a tunnel unit having a proximal end connected to the rotunda in such a manner that the tunnel unit is liftable and lowerable, the tunnel unit being configured to be extendable and retractable in a longitudinal direction of the tunnel unit;

a cab rotatably provided at a distal end of the tunnel unit, a distal end part of the cab being configured to be docked with an entrance of an aircraft;

a lifting/lowering device mounted to the tunnel unit or the cab, the lifting/lowering device being configured to lift and lower the tunnel unit or the cab by extending and retracting in an upward/downward direction;

a travel device mounted under the lifting/lowering device, the travel device being configured to travel on a ground and rotate in forward and reverse directions about an axis that passes through a center point of the travel device, such that a travel direction of the travel device is changeable;

a cab rotator configured to rotate the cab;

a first camera and a second camera mounted to the cab, the first camera and the second camera being configured to capture respective images of the entrance of the aircraft; and a controller configured to control the travel device, the lifting/lowering device, and the cab rotator, wherein the controller is configured to determine respective position coordinates that indicate a respective position of each part of the aircraft and of the passenger boarding bridge via a three-dimensional orthogonal coordinate system in which a predetermined position is set as an origin, the three-dimensional orthogonal coordinate system including a horizontal X-axis, a horizontal Y-axis, and a vertical Z-axis, and in a first entrance position calculation process, the first camera and the second camera capture the respective images of the entrance of the aircraft when the cab is at a predetermined standby position from which the cab starts moving, and the controller calculates position coordinates of a reference point on the entrance of the aircraft based on the respective images of the entrance captured by the first camera and the second camera;

in a cab stop position calculation process, the controller calculates target coordinates of a reference point on the distal end part of the cab at a temporary stop position of the cab based on the position coordinates of the reference point on the entrance of the aircraft calculated in the first entrance position calculation process, the temporary stop position being a position at which the distal end part of the cab is located forward of and away from the entrance by a predetermined distance;

in a first inverse kinematics calculation process, the controller calculates, via inverse kinematics, target position coordinates of the center point of the travel device, a target length of the lifting/lowering device, and a target rotational angle of the cab with respect to the tunnel unit for the cab at the temporary stop position based on the target position coordinates of the reference point on the distal end part of the cab at the temporary stop position and a rotational angle of the cab at the temporary stop position at which the distal end part of the cab would be parallel to a fuselage guide line on an apron, with respect to a positive direction of the X-axis; and in a first moving process of moving the cab from the standby position to the temporary stop position, the travel device travels such that coordinates of the center point of the travel device are brought into alignment with the target position coordinates of the center point of the travel device calculated in the first inverse kinematics calculation process, the lifting/lowering device extends or retracts to adjust a length of the lifting/lowering device to correspond to the target length calculated in the first inverse kinematics calculation process, and the cab rotator adjusts a rotational angle of the cab with respect to the tunnel unit to correspond to the target rotational angle calculated in the first inverse kinematics calculation process.

2. The passenger boarding bridge according to claim 1, wherein the rotational angle of the cab at the temporary stop position at which the distal end part of the cab would be parallel to the fuselage guide line on the apron is, in a plan view, an angle that is formed by the positive direction of the X-axis and a horizontal direction orthogonal to the fuselage guide line on the apron.

3. The passenger boarding bridge according to claim 1, further comprising a pair of distance sensors that are mounted to the cab such that the distance sensors are spaced apart from one another in a horizontal direction, each distance sensor of the pair of distance sensors being configured to measure a respective distances between the distal end part of the cab and the aircraft, wherein while the cab is stopped at the temporary stop position, the cab rotator rotates the cab such that the respective distances between the distal end part of the cab and the aircraft measured by the pair of distance sensors are made equal;

in a second entrance position calculation process, one of the first camera and the second camera captures an image of the entrance of the aircraft, and the controller calculates the position coordinates of the reference point on the entrance of the aircraft based on the captured image of the entrance and the respective distances between the distal end part of the cab and the aircraft measured by the pair of distance sensors;

in a cab docking position calculation process, the controller calculates target position coordinates of the reference point on the distal end part of the cab at a docking position of the cab based on the position coordinates of the reference point on the entrance of the aircraft calculated in the second entrance position calculation process, the docking position being a position at which the distal end part of the cab is to be docked with the entrance;

in a second inverse kinematics calculation process, the controller calculates, via inverse kinematics, target position coordinates of the center point of the travel device, a target length of the lifting/lowering device, and a target rotational angle of the cab with respect to the tunnel unit for the cab at the docking position based on the target position coordinates of the reference point on the distal end part of the cab at the docking position and a rotational angle of the cab at the docking position at which the distal end part of the cab would be parallel a horizontally extending tangent line that touches a part of the aircraft with which the cab is to be docked, with respect to the positive direction of the X-axis; and in a second moving process of moving the cab from the temporary stop position to the docking position, the travel device travels such that the center point of the travel device moves toward the target position coordinates of the center point of the travel device calculated in the second inverse kinematics calculation process, the lifting/lowering device extends or retracts to adjust the length of the lifting/lowering device to correspond to the target length calculated in the second inverse kinematics calculation process, and the cab rotator adjusts the rotational angle of the cab with respect to the tunnel unit to correspond to the target rotational angle calculated in the second inverse kinematics calculation process.

4. The passenger boarding bridge according to claim 3, wherein the rotational angle of the cab at the docking position at which the distal end part of the cab would be parallel to the horizontally extending tangent line that touches the part of the aircraft with which the cab is to be docked is, in a plan view, an angle that is formed by the positive direction of the X-axis and a horizontal direction orthogonal to the horizontally extending tangent line that touches the part of the aircraft with which the cab is to be docked.

* * * * *